(12) United States Patent
Goz et al.

(10) Patent No.: US 9,741,394 B2
(45) Date of Patent: *Aug. 22, 2017

(54) EFFICIENT CONTENT BASED VIDEO RETRIEVAL

(71) Applicant: PicScout (Israel) Ltd., Herzliya Pituach (IL)

(72) Inventors: Eli Goz, Raanana (IL); Sagie Shamay, Kibbutz Mishmarot (IL); Aran Pauker, Petach Tikva (IL); Lior Cohen, Kfar Daniel (IL); Uri Lavi, Netanya (IL)

(73) Assignee: PicScout (Israel) LTD., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,702

(22) Filed: Nov. 17, 2014

(65) Prior Publication Data

US 2015/0071607 A1   Mar. 12, 2015

Related U.S. Application Data

(63) Continuation of application No. 14/161,355, filed on Jan. 22, 2014, now Pat. No. 8,913,872.

(30) Foreign Application Priority Data

Aug. 29, 2013   (IL) .......................................... 228204

(51) Int. Cl.
| | |
|---|---|
| *H04N 9/80* | (2006.01) |
| *G11B 27/10* | (2006.01) |
| *G06K 9/00* | (2006.01) |
| *G11B 27/28* | (2006.01) |
| *G11B 27/34* | (2006.01) |
| *H04N 5/76* | (2006.01) |

(Continued)

(52) U.S. Cl.
CPC ........ *G11B 27/105* (2013.01); *G06K 9/00744* (2013.01); *G06K 9/00765* (2013.01); *G06K 9/6215* (2013.01); *G11B 27/28* (2013.01); *G11B 27/34* (2013.01); *H04N 5/76* (2013.01); *G06K 2009/4666* (2013.01); *G11B 2220/80* (2013.01)

(58) Field of Classification Search
CPC ...... H04N 5/92; H04N 5/93; H04N 19/00315; H04N 19/181; H04N 21/8549
USPC ............................ 386/241, 252; 375/240.24
See application file for complete search history.

(56) References Cited

U.S. PATENT DOCUMENTS 6,278,446 B1 * 8/2001 Liou ................. G06F 17/30802
382/168
6,639,945 B2   10/2003 Chaddha et al.
(Continued)

OTHER PUBLICATIONS

International Search Report and Written Opinion for counterpart PCT Application No. PCT/IL2014/050740, mailed Dec. 22, 2014 (8 pages).

(Continued)

*Primary Examiner* — Helen Shibru
(74) *Attorney, Agent, or Firm* — Perkins Coie LLP

(57) ABSTRACT

Various disclosed embodiments relate to video content analysis based in part upon the detection of shot transitions. In some embodiments, a process and computer system for detecting shot transitions in a video is used to separate a video sequence into a series of "shots" having multiple frames. These shots may then be used for additional processing, e.g., content detection within the video frames.

21 Claims, 7 Drawing Sheets

(51) Int. Cl.
*G06K 9/62* (2006.01)
*G06K 9/46* (2006.01)

(56) References Cited

U.S. PATENT DOCUMENTS

| | | | |
|---|---|---|---|
| 7,486,827 B2 | 2/2009 | Kim | |
| 8,078,761 B2 | 12/2011 | Cardina et al. | |
| 8,166,073 B2* | 4/2012 | Watanabe | G06F 17/30781 |
| | | | 707/796 |
| 8,644,596 B1* | 2/2014 | Wu | G06K 9/00201 |
| | | | 382/154 |
| 8,913,872 B1* | 12/2014 | Goz | G06K 9/00744 |
| | | | 375/240.24 |
| 2003/0123541 A1* | 7/2003 | Jun | H04N 5/147 |
| | | | 375/240.08 |
| 2005/0123052 A1 | 6/2005 | Rabinowitz et al. | |
| 2006/0062474 A1* | 3/2006 | Paschalakis | G06K 9/6212 |
| | | | 382/190 |
| 2006/0093215 A1* | 5/2006 | Paschalakis | G06F 17/3025 |
| | | | 382/173 |
| 2006/0182368 A1 | 8/2006 | Kim | |
| 2006/0198603 A1* | 9/2006 | Yao | G06F 17/30781 |
| | | | 386/280 |
| 2006/0288291 A1* | 12/2006 | Lee | H04N 5/147 |
| | | | 715/723 |
| 2007/0025615 A1* | 2/2007 | Zhou | G06K 9/00765 |
| | | | 382/173 |
| 2007/0248243 A1 | 10/2007 | Ko et al. | |
| 2008/0044085 A1* | 2/2008 | Yamamoto | G06K 9/00711 |
| | | | 382/190 |
| 2008/0316307 A1* | 12/2008 | Petersohn | G06K 9/00765 |
| | | | 348/135 |
| 2011/0063453 A1* | 3/2011 | Han | G11B 27/28 |
| | | | 348/180 |
| 2013/0251331 A1* | 9/2013 | Sambongi | H04N 5/772 |
| | | | 386/227 |

OTHER PUBLICATIONS

"http://en.wikipedia.org/wiki/Shot_transition_detection, Jul. 10, 2013, 5 pages, (retrieved Jul. 24, 2013)."
"Non-Final for U.S. Appl. No. 14/161,355, Mail Date Apr. 17, 2014, 7 pages."
"Notice of Allowance for U.S. Appl. No. 14/161,355, Mail Date Aug. 18, 2014, 8 pages."
Extended European Search Report for counterpart European Patent Application No. 14839488.5, mailed Mar. 3, 2017 (10 pages).
Zhicheng Zhao et al: "A segment-based advertisement search method from TV stream", Future Computer and Communication (ICFCC), 2010 2nd International Conference on, IEEE, Piscataway, NJ, USA, May 21, 2010 (May 21, 2010 ), pp. V2-690-V2-693, XP031698976.
D.N. Bhat et al: "Ordinal measures for image correspondence", IEEE Transactions on Pattern Analysis and Machine Intelligence, vol. 20, No. 4, Apr. 1, 1998 (Apr. 1, 1998), pp. 415-423, XP055349015, USA ISSN: 0162-8828, DOI: 10.1109/34. 677275.
M. Bennamoun et al: "Transform-based Techniques: Non-parametric Techniques", in: "Object Recognition: Fundamentals and Case Studies", pp. 58-61, Springer, 2002, XP055349019.
Cotsaces C et al: "Video shot detection and condensed representation. A review", IEEE Signal Processing Magazine, IEEE Service Center, Piscataway, NJ, US, vol. 23, No. 2, Mar. 1, 2006 (Mar. 1, 2006 ), pp. 28-37, XP002524623, ISSN: 1053-5888, DOI: 10.1109/MSP.2006.1621446.

* cited by examiner

1
EFFICIENT CONTENT BASED VIDEO RETRIEVAL

CROSS-REFERENCE TO A RELATED APPLICATION

This application claims the benefit of, the priority to, and is a continuation of U.S. patent application Ser. No. 14/161, 355, entitled "EFFICIENT CONTENT BASED VIDEO RETRIEVAL," filed Jan. 22, 2014, which claims priority to Israel Patent Application No. 228204, entitled "EFFICIENT CONTENT BASED VIDEO RETRIEVAL," filed Aug. 29, 2013. Each of these applications is incorporated herein by reference in their entireties for all purposes.

FIELD OF THE INVENTION

Various of the disclosed embodiments relate to video content analysis.

BACKGROUND

With the growth of the Internet, the creation and distribution of video content has increased dramatically. The need to analyze and understand this content has likewise increased. For example, there is an increasing need to identify videos containing illegal material, violations of an artist's copyright, criminals, etc. To perform these detections, the video content must be processed and analyzed. Unfortunately, the sheer volume of video data and the difficulty of identifying relevant portions of the video data often thwart such attempts. In some cases, adequate tools may exist to perform an analysis, but the analysis is only tractable when performed on a handful of image frames. If the tools were applied to entire videos, it would take far too long to receive the results. Furthermore, some tools are more suitable in some contexts than others. When applied indiscriminately to videos of every quality and character these tools may return false positives or misdirect a suite of other analysis tools.

Accordingly, there exists a need for systems and methods to effectively decompose video into manageable units for analysis. Particularly, there is a need to effectively ascertain boundaries in video content, so that subsequently applied tools and analysis techniques may be more efficiently applied. Such tools are needed to remove duplicate videos retrieved from searches, mining the internal structure of video databases, perform automatic video tagging, performed automatic detection of copyright infringements, etc. The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present disclosure are illustrated by way of example and not limitation in the accompanying figures, in which like references indicate similar elements.

Figure 1:
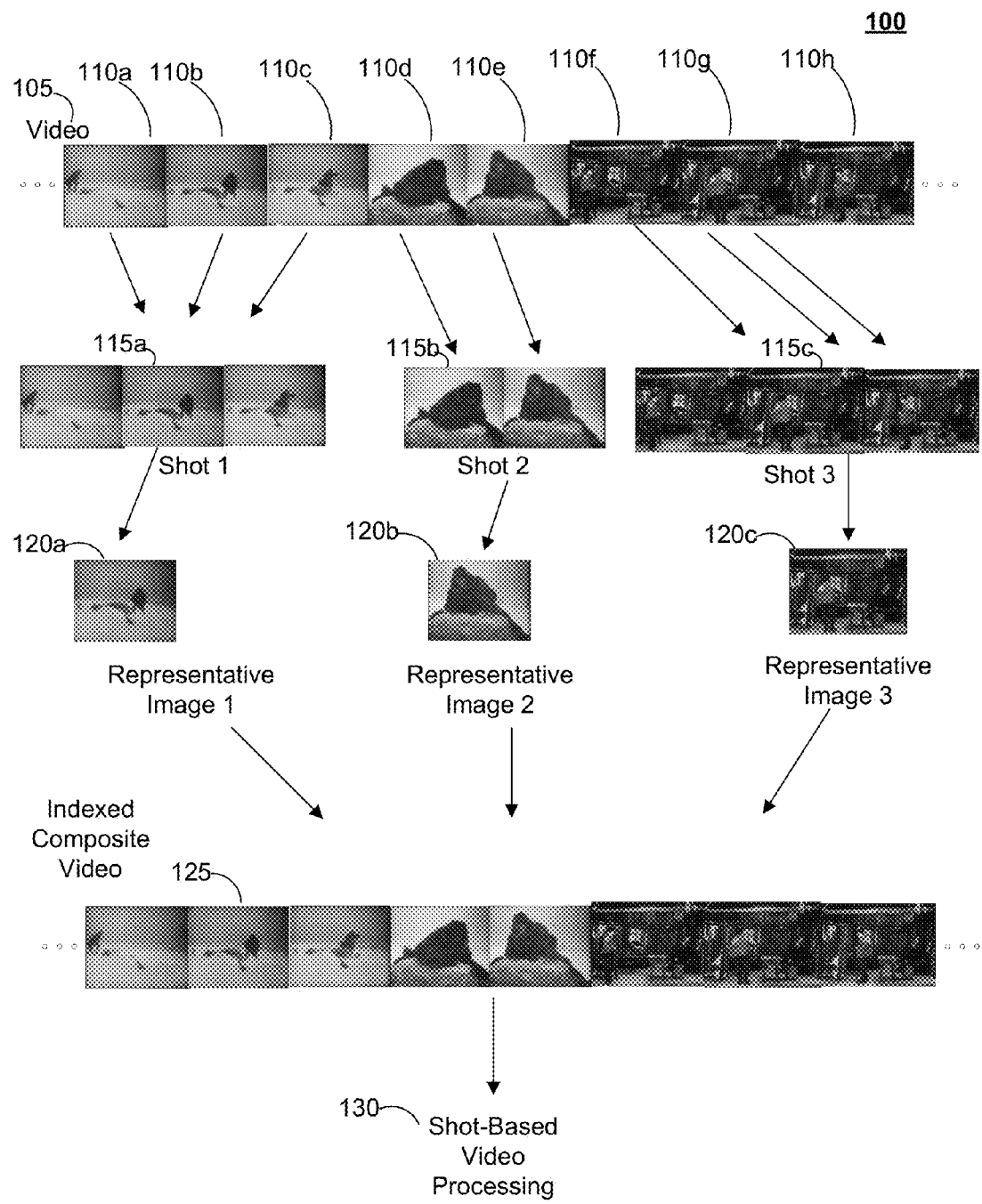
FIG. 1 is a schematic block diagram depicting various aspects of a video processing operation, including a shot transition detection analysis, as may be implemented in some embodiments.

Those skilled in the art will appreciate that the logic illustrated in each of the flow and sequence diagrams discussed herein may be altered in a variety of ways. For example, the order of the logic may be rearranged, sub-blocks may be performed in parallel, illustrated logic may be omitted, other logic may be included, etc. The depicted examples are provided in the depicted manner merely for purposes of explanation and for the convenience of the reader.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

System Overview

Various disclosed embodiments relate to video content analysis based in part upon the detection of shot transitions. In some embodiments, a process and computer system for detecting shot transitions in a video is used to separate a video sequence into a series of "shots" having multiple frames. These shots may then be used for additional processing, e.g., content detection within the video frames. Generally, a frame may be a basic discrete unit of a digital video. Each frame may be an image.

FIG. 1 is a schematic block diagram depicting various aspects of a video processing operation 100, including a shot transition detection analysis, as may be implemented in some embodiments. A video 105 may include a sequence of frames 110a-h. These frames 110a-h may include pixel arrays, compressed frames, e.g. MPEG Intraframes, P-frames, etc.

A processing system may organize frames 110a-h into "shots" 115a-c. A shot is a collection of frames. Shots may be the collection of frames found between two transitions (e.g., a wipe, hard cut, dissolve, etc.). In some embodiments, shots generally comprise interrelated consecutive frames taken contiguously by a single camera that represent a continuous action in time and space. In the depicted example, Shot 1 115a depicts a man pulling a sled, Shot 2 115b depicts the man adjusting the sled's contents, and Shot 3 115c depicts two figures within a cabin. Ideally, a processing system may identify shots suitable for subsequent analysis. The shots may be indexed, for example, using a representative image 120a-c. The indexed video data 125 may then be provided to a shot-based video processing system 130 for further analysis. For example, shot-based video processing system 130 may include multiple tools adapted for certain video conditions. One technique may perform object recognition within a scene depicting a large open space, while another technique may be better suited for close-up shots of an actor's face. Accordingly, some techniques may have better success with some shots than with others.

Properly deducing the boundary frames between shots 115a-c may be difficult, however. Improperly selecting bounds may reduce the efficiency in shot-based processing 130 and may result in a failure to recognize objects, copyrighted material, etc. For example, the creator of the video 105 may have illegally incorporated copyrighted material, but performed a transformation (e.g., a flip) to avoid detection efforts. In some instances, shot-based processing 130 may be able to detect the infringing material despite the transformation, but only if the material is not split across shot boundaries. Accordingly, accurate identification of shot boundaries is relevant to the analysis process.

Example Content Identification Process

Figure 2:
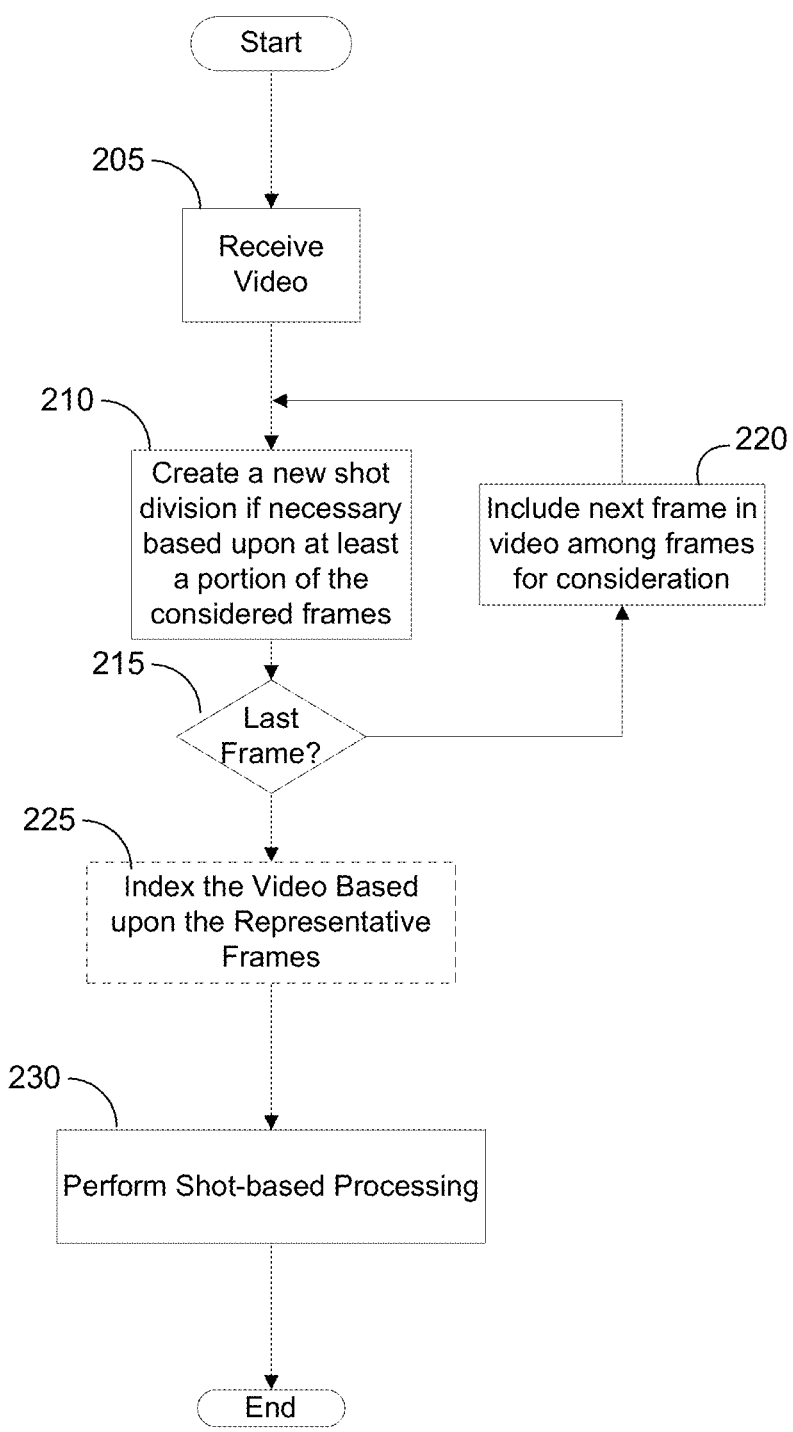
FIG. 2 is a flow diagram depicting various steps in a process for determining shot transitions in video based on frame-by-frame analysis as may be implemented in some embodiments.

FIG. 2 is a flow diagram depicting various steps in a process 200 for determining shot transitions in video based on frame-by-frame analysis as may be implemented in some embodiments.

At block 205 the system receives video data. At block 210 the system may seek to identify shots and their boundaries in the video data. Particularly, the system may analyze the considered frames of the video (for example, the most recent 100 frames considered) and determine whether to create a new shot division. Where the frames are compressed, in some embodiments the system may convert the compressed frames to pixel frames (e.g., using neighboring Intra-frames to convert a P-frame to a pixel image).

If the frame most recently added to the group of considered frames is not determined to be the last frame to be considered at block 215, then at block 220 the system may include the next frame in the view among the frames for shot transition detection consideration. As discussed in greater detail below, the consideration of past frames may rely on metrics applied to one or more frames, which may be used to recognize patterns in the frame content over time.

Once all the pertinent frames have been considered, and the shot transitions identified, the system may proceed to block 225. At block 225 the system may index the video data set, e.g., using representative frames (one will recognize that indexing may occur with the identification of shot transitions in some embodiments). At block 230 the system, or a related system, may perform shot-based processing of the indexed data (e.g. image recognition and matching algorithms upon the frames of a shot).

In some embodiments, rather than perform an iterative process the system may first partition the video into a sequence of consecutive frames and afterwards divide these frames into shots. For example, the shots are not detected upon receipt of every arriving frame but in a two-step process instead. First the system partitions the video into frames and then detects shot boundaries.

Example Frame Analysis for Shot Identification

Figure 3:
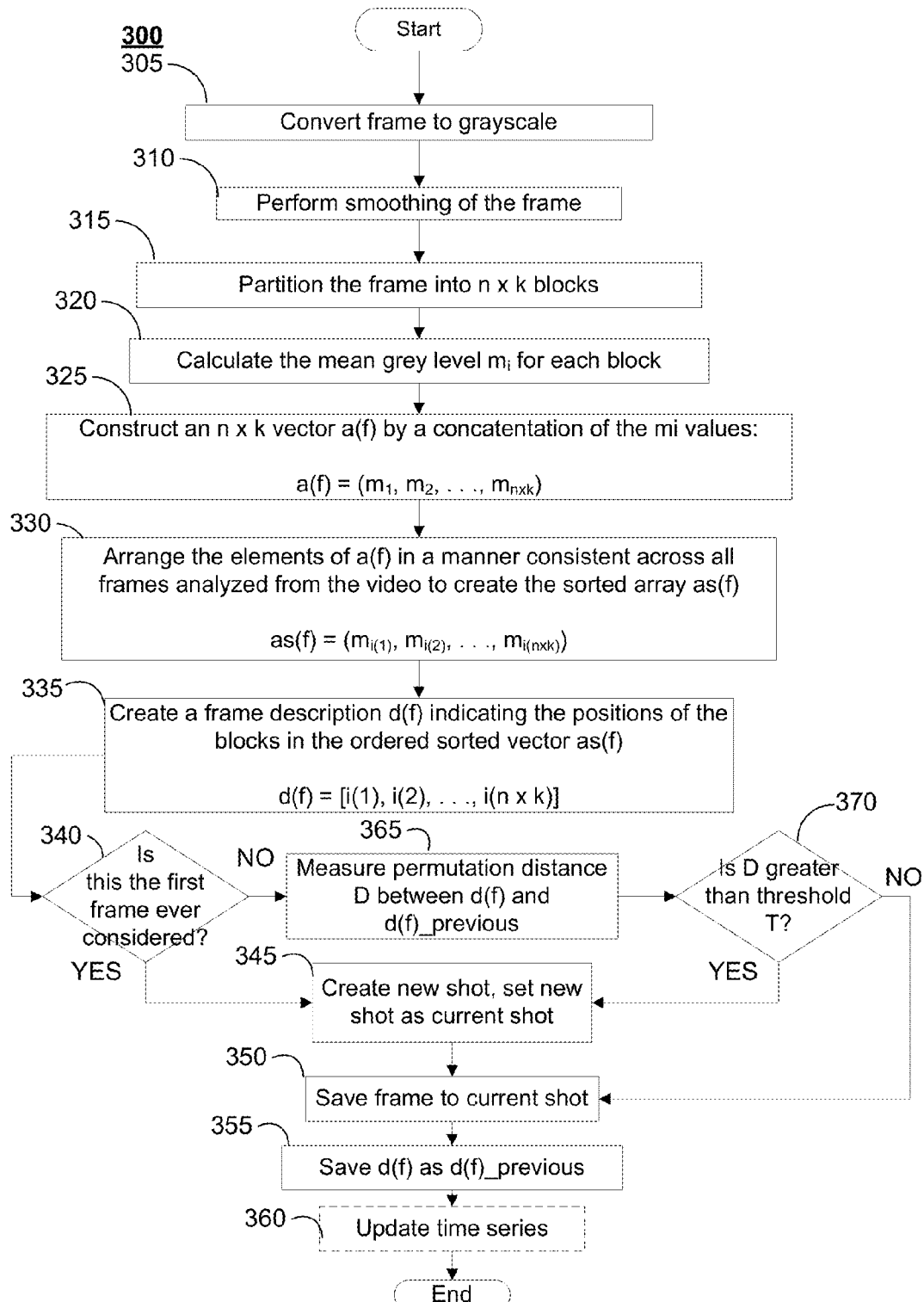
FIG. 3 is a flow diagram depicting various steps in shot transition detection process.

FIG. 3 is a flow diagram depicting various steps in shot transition detection process 300 as may be implemented in some embodiments. Particularly, the process 300 may be applied to a succession of frames in the video sequence, as discussed above in relation to block 210 of FIG. 2. Accordingly, FIG. 3 depicts a single iteration of the process and one will recognize that various of the depicted steps may be performed iteratively over a sequence of frames. For example, process 300 may be performed as part of block 210

(the current shot adjusted and new shots created as more frames are considered via block 220).

At blocks 305 and 310, the system may pre-process the frame, e.g., by converting the frame to grayscale at block 305 and performing smoothing of the frame 310 to remove artifacts. The frame may also be converted from a compressed form to a stand-alone pixel image as discussed above.

At block 315 the system may partition the frame into n×k blocks. A "block" as used herein refers to a portion of the frame. For example, in a pixel image frame comprising a width of 256 pixels and a height of 256 pixels, the frame may be subdivided into eight blocks, each comprising a width of 128 pixels and a height of 64 pixels. As in this example, the blocks need not be symmetrical, though they may be.

At block 320, the system calculates the mean gray-scale value of each block $m_i$. For example, the system may sum each of the values in the 8,192 pixels in a block above (64×128=8,192) and divide the sum by 8,192. Though a mean gray-scale value is referenced for purposes of explanation in this example, some embodiments contemplate basing the analysis on another value. For example, different embodiments contemplate using different color space components, e.g. a red component in an RGB pixel, a hue component in an HSV pixel, etc. Some embodiments convert between color spaces to perform different analyses. Though a "gray-scale value" and a "mean" are referenced in this example, other values (hue, chroma, etc.), derivations from values (averages of red and green components, eigenvalue representations, etc.), and other statistical determinations (mode, variance, etc.) may be substituted instead.

At block 325, the system constructs a vector a(f) by concatenating each of the values $m_i$. The concatenation need not by physical, but rather may be purely logical. For example, the system may create an array indexing the block values, may represent the concatenation via pointer allocations, etc.

At block 330, the system may arrange the elements of a(f) in a manner consistent across all frames, or a portion of the previous frames, analyzed from the video. This arranged vector is referred to herein as as(f). As will be recognized by one skilled in the art, the rearrangement may take any suitable form, e.g., a new structure reindexing the elements, a rearranging of the elements in a(f), a new structure referencing only positions in a(f), etc. In some embodiments, the arrangement is a partial ordering or more particularly may be a total ordering in some embodiments. In other embodiments, the ordering may be a "Gaussian" type distribution about a mid-point value (smallest values at each end of the vector and largest in the center, or vice versa). In some embodiments, "ties" between blocks are handled based on the context of the image (e.g., the value of neighboring pixels or blocks).

At block 335, the system may create a frame description d(f) indicating the positions of the blocks in the ordered sorted vector as(f). Again, the description may be a logical or physical structure in the computer system, for example, an actual allocation of memory for an array, or a logical representation by indirect means, such as a pointer collection. For example, some implementations may not create d(f) directly but may instead perform operations with as(f) that indirectly consider block positions. In these implementations, a preceding frame's as(f) may be saved for creation of d(f)_previous as described in greater detail below.

At block 340, the system determines if this is the first frame considered. Again, the depicted steps are for purposes of explanation and many implementations need not literally perform this check following creation of any other step. Rather, the system may check for the existence of a d(f)_previous value with which to perform a comparison.

If this is the first frame considered, or at least there is no d(f)_previous yet in existence, the process may proceed to block 345. At block 345, the system may create a new shot and set the new shot as the current shot under consideration. Creation of a "new" shot may comprise creating a new data structure to store frames, a reference to frames, a range of frames, etc. In some embodiments, this block may also include any finishing procedures regarding the previous frame (e.g., specifying an ending frame of the past shot).

At block 350, the process may save the frame to the current shot (e.g., inserting a copy of the frame into the shot data structure, inserting a reference to the frame in the data structure, expanding a range in the shot data structure to include the frame, etc.).

At block 355, the process may save d(f) as d(f)_previous or otherwise make the information available for subsequent frame calculations. As discussed above, d(f) may be represented by a physical allocation of memory, or a logical structure, and its recordation as d(f)_previous may take many forms (e.g., saving a copy or record of as(f)).

At block 360, the process may update a time series of past frame comparisons in some embodiments. For example, the time series may depict a succession of permutation distances between frames. Using this information, the system may be able to assess a pattern to the distances to determine the presence and character of a shot transition, e.g., as described in greater detail with reference to FIGS. 5 and 6. An entry $t_i$ in the series may comprise:

$$t_i=[D_i-D_{i-1}]$$

where $D_i$ is the distance of a current frame and a preceding considered frame, and $D_{i-1}$ is the distance between the preceding considered frame and its preceding considered frame. At this point, following block 360, the process may select the next frame for consideration and repeat the process (returning to block 305 with the new frame) until all frames to be considered have been considered.

If at block 340 it is instead determined that a subsequent frame is under consideration (or a value for d(f)_previous otherwise exists, perhaps by a default initialization) the process may proceed to block 365. At block 365 the system may measure the permutation distance D between d(f) and d(f)_previous. One will recognize many methods for performing such a permutation metric. Some embodiments, for example, count the number of reorderings necessary to convert one descriptor (d(f)) to the other (d(f)_previous), in a manner analogous to the Levinshtein distance used in grammar. An example of this approach is discussed in relation to FIG. 4.

At block 370, the system may determine whether D indicates a shot transition, e.g. by exceeding a threshold. In some embodiments, not only the current D, but previously considered Ds from the time series at block 360 are used to determine whether a shot transition exists. If a transition has occurred the system may create a new shot at block 345. If a transition has not occurred, the frame may be stored in the current shot at block 350. Again, the described process 300 of FIG. 3 is just one possible implementation of an embodiment and one will readily recognize variations. For example, rather than place only the currently considered frame in a new shot, at block 370 the system may consult the series from block 360 and determine that the "mid-point" of the shot transition in fact occurred several frames previously (e.g. as may occur in a soft transition as described below in FIG. 5). While the depicted example may detect hard transitions properly, a consideration of past frames at block 370 may more readily detect soft transitions. Accordingly, frames preceding the current frame until the mid-point may be included in the new shot rather than the previous shot.

Figure 4:
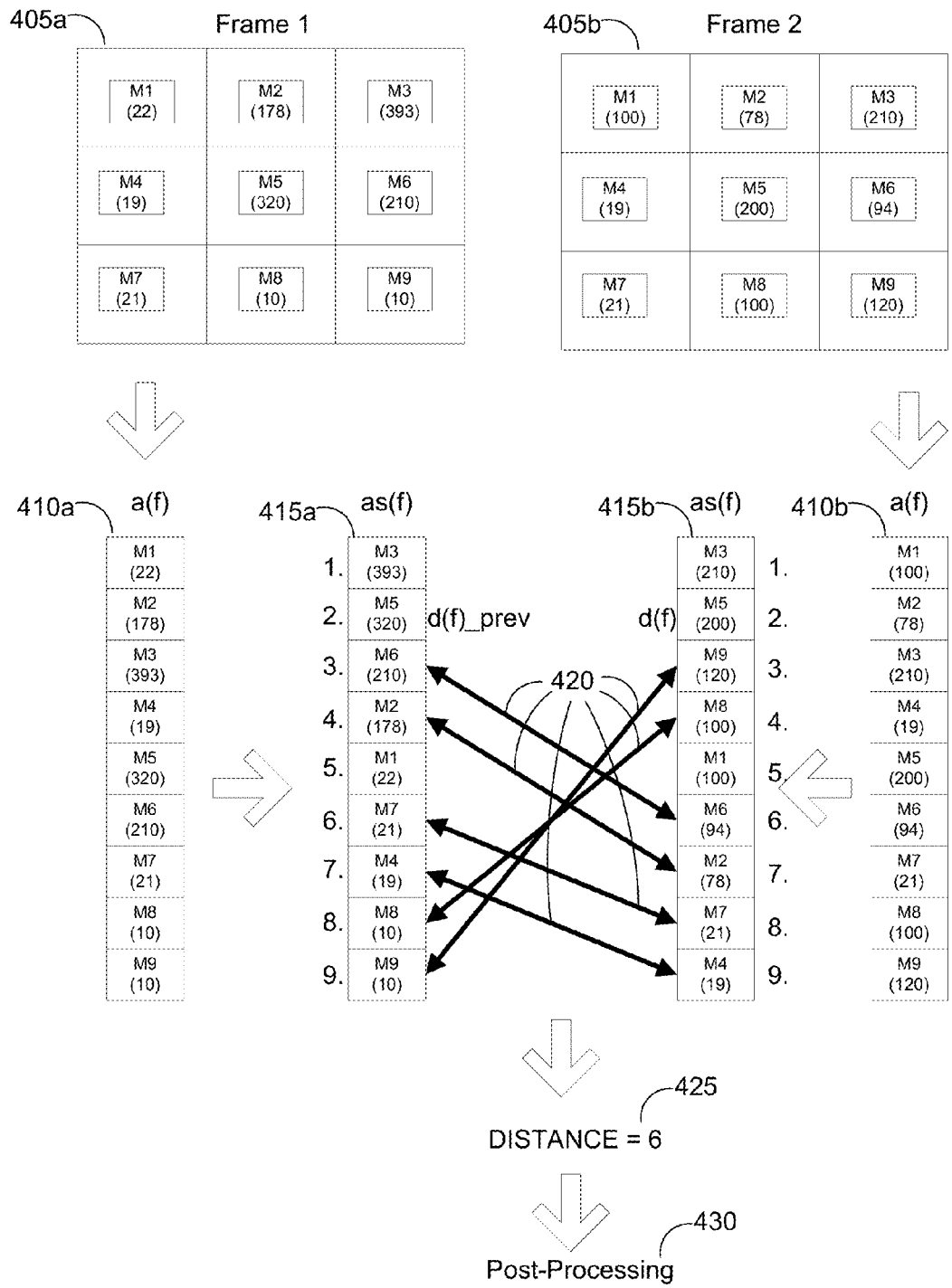
FIG. 4 is a schematic block diagram depicting various aspects of a shot transition detection process.

FIG. 4 is a schematic block diagram depicting various aspects of a shot transition detection process as may be implemented in some embodiments. FIG. 4 also depicts one possible permutation metric that may be applied in some embodiments to determine the distance between two frame descriptions.

The process may consider a first frame 405a and a second frame 405b. In this example, each frame 405a-b has been broken down into nine blocks and a block value M1-M9 calculated for each. As discussed above, the block value may be, e.g., the mean value of a portion of a color space (e.g., a grayscale value). Block M1 of the first frame 405a, for example, may have a block value of 22. Block M1 of the second frame 405b, may instead have a block value of 100. This may occur, e.g., because each frame depicts a different image.

The blocks for each frame may be organized into vectors a(f) 410a-b as described above with respect to FIG. 3. Each of the vectors a(f) may then be sorted to create sorted vectors as(f) 415a-b (again, the allocations in memory need not be physically copied, but, e.g., references such as pointers may be exchanged). In the depicted example, the sorting is performed from greatest block number to least as a partial ordering. In some embodiments, ties may be handled based on a tie-breaking criterion. For example, blocks M8 and M9 of as(f) 415a share the value 10 and may be ordered based upon their position in the frame.

A permutation metric may then be applied, which may, e.g., recognize inconsistent block locations in the two sorted vectors as(f) 415a-b. For example, in each sorted vector as(f) 415a-b the blocks, M3, M5, and M1 may occupy the same positions. However, as indicated by correspondences 420 the other blocks may be located in different positions in the two vectors. As six of the blocks occupy different positions, the permutation distance D 425 may be calculated as six (in some embodiments the number of blocks may be many more than nine and the range of distances accordingly much greater).

The system may then perform post processing 430, such as shot transition detection, using the determined distance. The above-described metric may be robust to smooth camera movements and sensitive to a wide variety of shot transitions on the other.

Shot Transition Taxonomy and Detection

Figure 5:
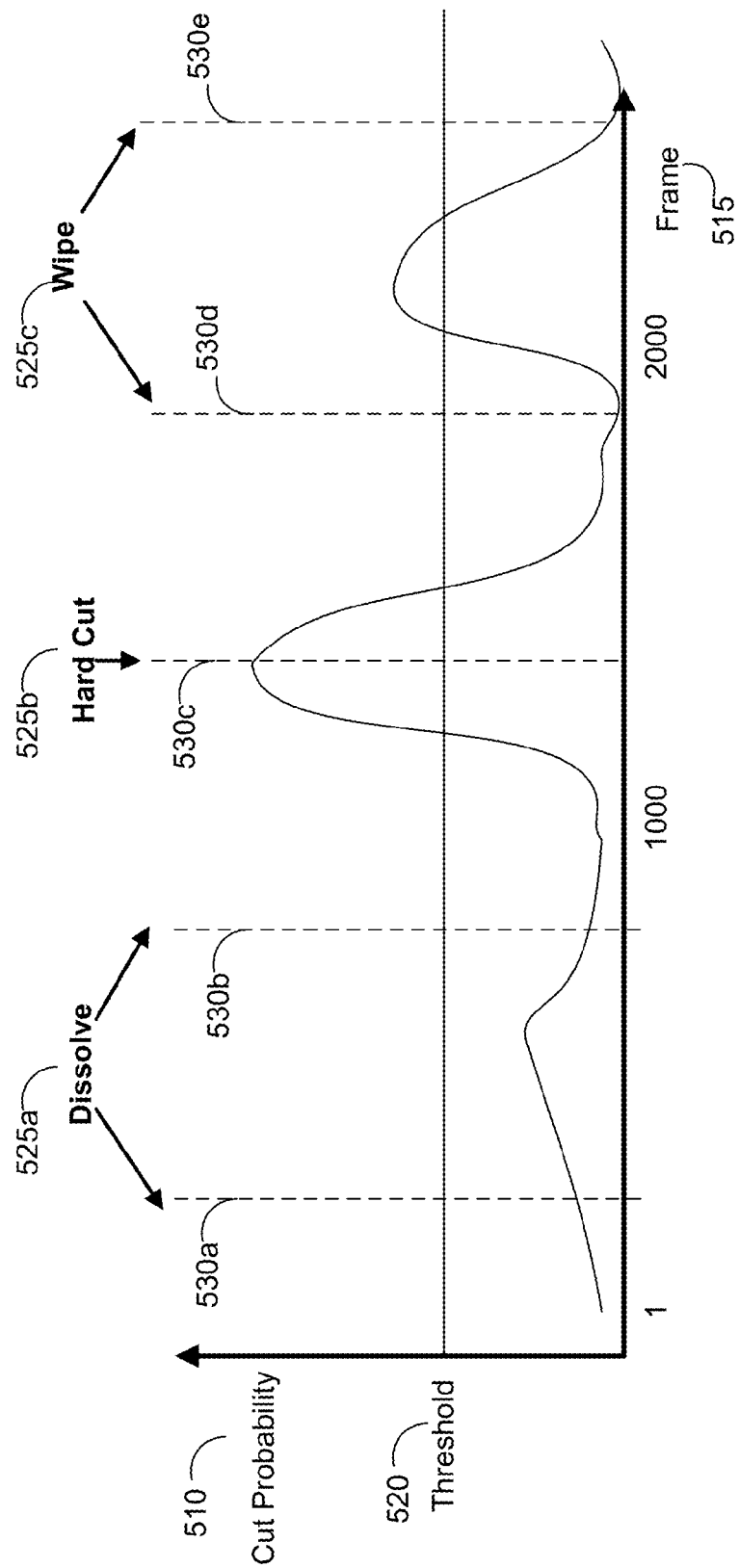
FIG. 5 is a time-series plot depicting various shot transitions in a video sequence.

FIG. 5 is a time-series plot 500 depicting various shot transitions in a video sequence as may be detected by various disclosed embodiments. The plot indicates the probability of a cut 510 over frames 515 in a video. As indicated, a hard cut 525b, where a transition occurs quickly over only a handful of frames or a single frame, may create a sharp peak in the probability at shot boundary 530c. The probability may be derived, e.g. from the permutation distance between frames. A dissolve 525a, beginning at frame 530a and ending at 530b may be more difficult to detect, as the probability may not exceed a threshold 520. A wipe 525c may be less difficult to detect, for while the transition is also gradual, the two scenes remain independently depicted in the frame for multiple frames. Based on the probabilities derived from the permutation distances, the above described operations of FIG. 3 may detect four shots with three intervening transitions 525a-c.

Figure 6:
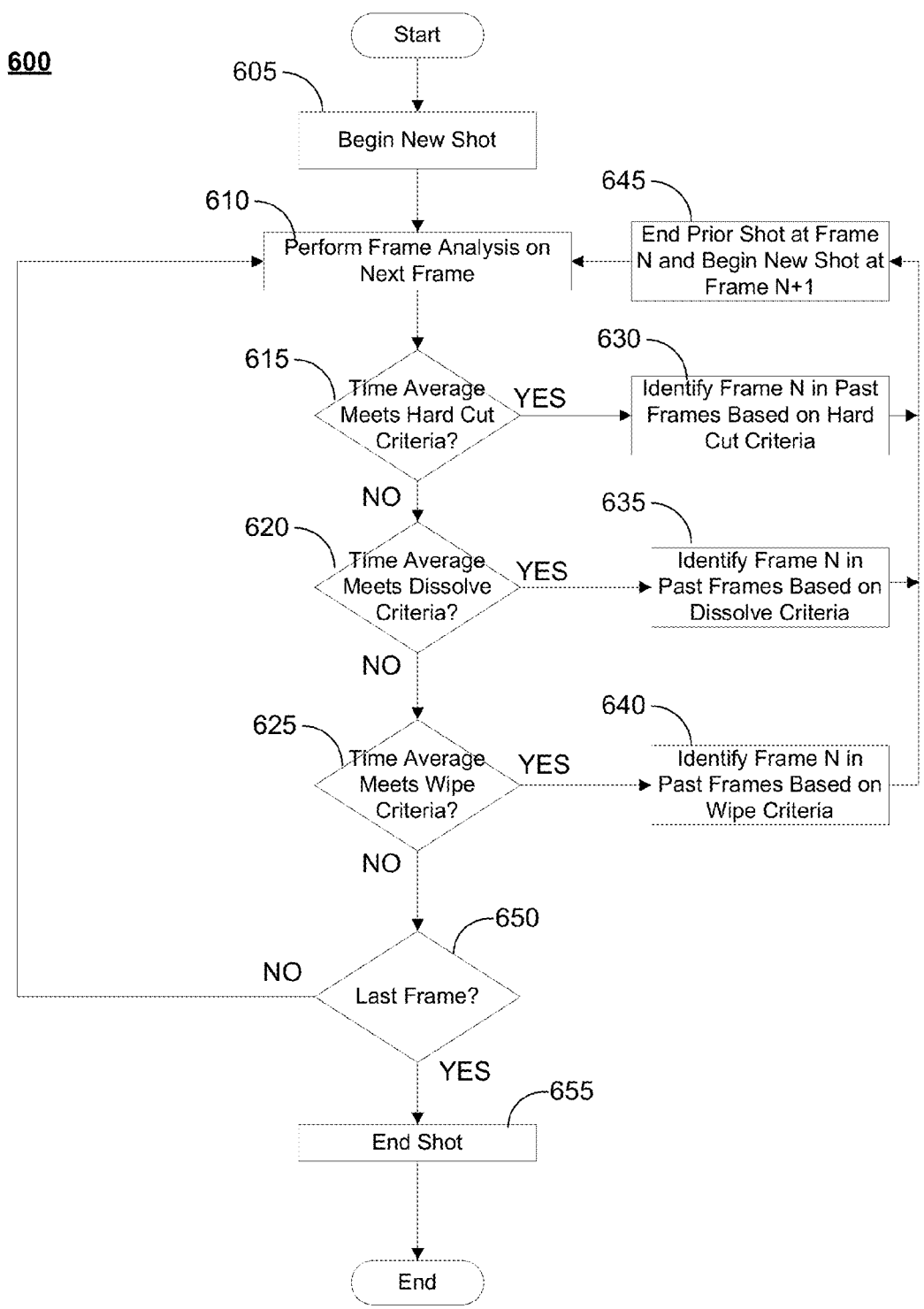
FIG. 6 is a flow diagram depicting various steps in a process for detecting different transition types as may be implemented in some embodiments.

FIG. 6 is a flow diagram depicting various steps in a process for detecting different transition types as may be implemented in some embodiments. At block 605, the process begins a new shot. At block 610, the process may perform an analysis on the next frame to be considered, for example, an analysis comprising blocks from FIG. 3.

At block 615 the system, e.g., by consulting the time series, may determine if the past frames suggest a hard cut shot transition. At block 620 the system, again e.g., by consulting the time series, may determine if the past frames suggest a dissolve shot transition. At block 625 the system, again e.g., by consulting the time series, may determine if the past frames suggest a wipe shot transition. Though only three transition types are depicted in this example, one will recognize that any number and gradation of transitions may be measured by the system. The process may continue until the last frame to be considered has been considered. From block 650 the process may end the current shot at block 655 before ending.

When a shot transition is detected, the process may perform the corresponding boundary frame detection at blocks 630, 635, and 640 (referred to herein as Frame N). For example, with reference to FIG. 5, a boundary Frame N may be found at frames 4, 10, and 15. Some embodiments may be more granular than a frame level and may include the same frames in two shots with an indication of the presence in each shot (e.g., in a dissolve transition, frames may have diminishing relevance to one shot as they have increasing relevance to the subsequent shot).

At block 645 the process may take steps to end the preceding shot at or before Frame N and to begin a new shot at or after Frame N.

The transition detection operations described above may be refined in various manners in some embodiments. For example, very short shots (e.g., comprised of up to 3 frames) may be quite unlikely and may be due to sudden illumination, motion or other physical changes inside the original shot. Accordingly, if an above-described algorithm detects such a short shot, the preceding shot may be continued using these frames.

Conversely, the detection of very long shots (relative to the other shots) may be due to soft transitions (dissolving, fading or wiping) between shots instead of an abrupt cut. Soft transitions may be difficult to detect. This problem may be addressed with different heuristics. For example, adaptive distance thresholding based on sliding window statistics may be applied, which may enable higher resolution of shot boundary detection.

In some embodiments, rather than finding only boundary frames (Frame N) the system may identify shots as having a beginning frame, an end frame, and a midpoint frame. Post processing may be performed on the beginning and end frames to more finely identify the effects of soft transitions.

Computer System Overview

Figure 7:
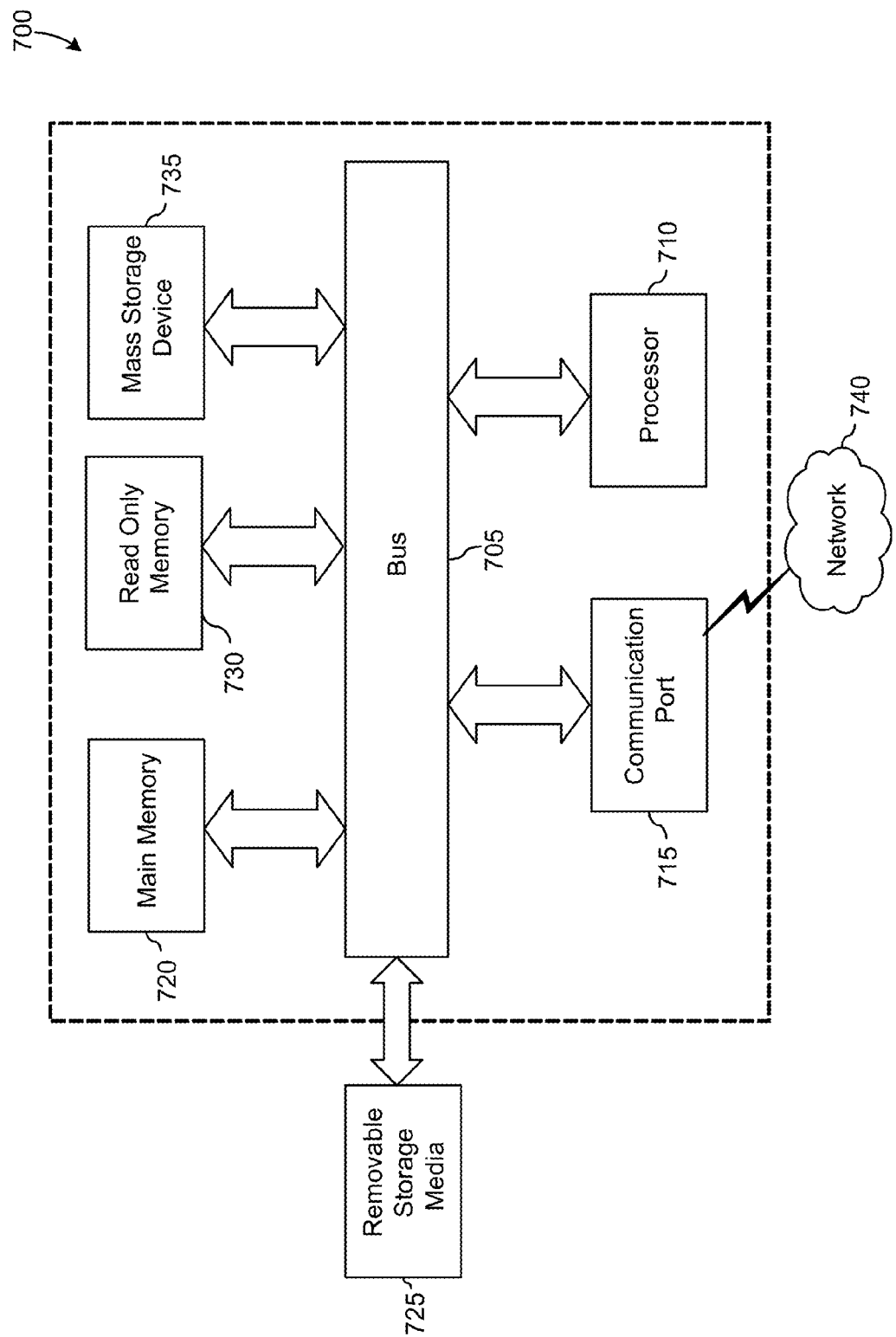
FIG. 7 is a block diagram of a computer system as may be used to implement features of some of the embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is a block diagram of a computer system 700 as may be used to implement features of some of the embodiments. Various of the disclosed features may be located on computer system 700. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor (s), or AMD® Opteron® or Athlon MP® processor(s), or Motorola® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects, including wireless networks.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage and communication blocks. Bus 705 can be a PCI/PCI-X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only suitable embodiments.

Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionality may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

What is claimed is:

1. A computer-implemented method for identifying a shot transition in an image sequence, comprising:
    determining a first ordering of a first multiple of blocks in a first frame of the image sequence based upon block values associated with the first multiple of blocks;
    determining a second ordering of a second multiple of blocks in a second frame of the image sequence based upon block values associated with the second multiple of blocks;
    determining a distance between the first frame and a second frame based upon a permutation of the first ordering of the first multiple of blocks so as to correspond to the second ordering of the second multiple of blocks;
    storing the distance in a time series of past frame comparisons, the past frame comparisons including distances between frames that precede the first and second frame;
    determining the existence of a shot transition based upon distances in at least a portion of the time series of past frame comparisons;
    identifying a first shot and a second shot based on the determined shot transition, wherein the first shot is comprised of a plurality of frames that precede the shot transition and the second shot is comprised of a plurality of frames that follow the shot transition;
    processing the first shot with a first video tool adapted for video conditions of the first shot; and
    processing the second shot with a second video tool adapted for video conditions of the second shot.

2. The computer-implemented method of claim 1, wherein determining the existence of a shot transition comprises determining a pattern in the time series.

3. The computer-implemented method of claim 2, further comprising:
    determining a midpoint of the shot transition based upon the pattern in the time series.

4. The computer-implemented method of claim 1, wherein determining a distance comprises determining a number of reorderings between the first multiple of blocks in the first frame and the second multiple of blocks in the second frame.

5. The computer-implemented method of claim 1, wherein determining a distance between the first frame and a second frame based upon the permutation comprises:
    identifying a number of position relocations in the first ordering of the first multiple of blocks in the first frame needed to create the block ordering in the second ordering of the second multiple of blocks in the second frame.

6. The computer-implemented method of claim 1, further comprising:
    grayscaling the first frame and the second frame before determining the block values of the first multiple of blocks and the block values of the second multiple of blocks, and wherein the block values comprise an average of the grayscale values within each block.

7. The computer-implemented method of claim 1, wherein the first frame and the second frame comprise one of I-frames, P-Frames, or B-frames.

8. A non-transitory computer-readable medium comprising instructions executable by at least one processor to cause one or more computer systems to:
    determine a first ordering of a first multiple of blocks in a first frame of the image sequence based upon block values associated with the first multiple of blocks;
    determine a second ordering of a second multiple of blocks in a second frame of the image sequence based upon block values associated with the second multiple of blocks;
    determine a distance between the first frame and a second frame based upon a permutation of the first ordering of the first multiple of blocks so as to correspond to the second ordering of the second multiple of blocks;
    store the distance in a time series of past frame comparisons, the past frame comparisons including distances between frames that precede the first and second frame;
    determine the existence of a shot transition based upon distances in at least a portion of the time series of past frame comparisons;
    identify a first shot and a second shot based on the determined shot transition, wherein the first shot is comprised of a plurality of frames that precede the shot transition and the second shot is comprised of a plurality of frames that follow the shot transition;
    process the first shot with a first video tool adapted for video conditions of the first shot; and
    process the second shot with a second video tool adapted for video conditions of the second shot.

9. The non-transitory computer-readable medium of claim 8, wherein determining the existence of a shot transition comprises determining a pattern in the time series.

10. The non-transitory computer-readable medium of claim 9, further comprising:
determining a midpoint of the shot transition based upon the pattern in the time series.

11. The non-transitory computer-readable medium of claim 8,
wherein determining a distance comprises determining a number of reorderings between the first multiple of blocks in the first frame and the second multiple of blocks in the second frame.

12. The non-transitory computer-readable medium of claim 8, wherein determining a distance between the first frame and a second frame based upon the permutation comprises:
identifying a number of position relocations in the first ordering of the first multiple of blocks in the first frame needed to create the block ordering in the second ordering of the second multiple of blocks in the second frame.

13. The non-transitory computer-readable medium of claim 8, wherein the instructions are further executable by at least one processor to cause one or more computer systems to:
grayscale the first frame and the second frame before determining the block values of the first multiple of blocks and the block values of the second multiple of blocks, and wherein the block values comprise an average of the grayscale values within each block.

14. The non-transitory computer-readable medium of claim 8, wherein the first frame and the second frame comprise one of I-frames, P-Frames, or B-frames.

15. A computer system comprising:
at least one processor;
a memory comprising instructions executable by the at least one processor to cause the computer system to:
determine a first ordering of a first multiple of blocks in a first frame of the image sequence based upon block values associated with the first multiple of blocks;
determine a second ordering of a second multiple of blocks in a second frame of the image sequence based upon block values associated with the second multiple of blocks;
determine a distance between the first frame and a second frame based upon a permutation of the first ordering of the first multiple of blocks so as to correspond to the second ordering of the second multiple of blocks;
store the distance in a time series of past frame comparisons, the past frame comparisons including distances between frames that precede the first and second frame;
determine the existence of a shot transition based upon distances in at least a portion of the time series of past frame comparisons;
identify a first shot and a second shot based on the determined shot transition, wherein the first shot is comprised of a plurality of frames that precede the shot transition and the second shot is comprised of a plurality of frames that follow the shot transition;
process the first shot with a first video tool adapted for video conditions of the first shot; and
process the second shot with a second video tool adapted for video conditions of the second shot.

16. The computer system of claim 15, wherein determining the existence of a shot transition comprises determining a pattern in the time series.

17. The computer system of claim 15, the memory further comprising instructions executable by the at least one processor to determine a midpoint of the shot transition based upon the pattern in the time series.

18. The computer system of claim 15, wherein determining a distance comprises determining a number of reorderings between the first multiple of blocks in the first frame and the second multiple of blocks in the second frame.

19. The computer system of claim 15, wherein determining a distance between the first frame and a second frame based upon the permutation comprises:
identifying a number of position relocations in the first ordering of the first multiple of blocks in the first frame needed to create the block ordering in the second ordering of the second multiple of blocks in the second frame.

20. The computer system of claim 15, the memory further comprising instructions executable by the at least one processor to:
grayscale the first frame and the second frame before determining the block values of the first multiple of blocks and the block values of the second multiple of blocks, and wherein the block values comprise an average of the grayscale values within each block.

21. The computer system of claim 15, wherein the first frame and the second frame comprise one of I-frames, P-Frames, or B-frames.

* * * * *